United States Patent
Kwon et al.

(10) Patent No.: US 8,989,169 B2
(45) Date of Patent: Mar. 24, 2015

(54) METHOD FOR TRANSMITTING CONTROL INFORMATION IN WIRELESS MOBILE COMMUNICATION SYSTEM

(75) Inventors: Yeong Hyeon Kwon, Anyang-si (KR); Min Seok Noh, Anyang-si (KR); Jin Sam Kwak, Anyang-si (KR); Jae Hoon Chung, Anyang-si (KR); Seung Hee Han, Anyang-si (KR)

(73) Assignee: LG Electronics Inc., Seoul (KR)

(*) Notice: Subject to any disclaimer, the term of this patent is extended or adjusted under 35 U.S.C. 154(b) by 85 days.

(21) Appl. No.: 13/130,752

(22) PCT Filed: Nov. 19, 2009

(86) PCT No.: PCT/KR2009/006829
§ 371 (c)(1),
(2), (4) Date: Jul. 25, 2011

(87) PCT Pub. No.: WO2010/058979
PCT Pub. Date: May 27, 2010

(65) Prior Publication Data
US 2011/0274099 A1    Nov. 10, 2011

Related U.S. Application Data

(60) Provisional application No. 61/117,220, filed on Nov. 23, 2008.

(30) Foreign Application Priority Data

Jun. 2, 2009 (KR) .......................... 10-2009-0048497

(51) Int. Cl.
*H04W 4/00* (2009.01)
*H04B 7/208* (2006.01)
(Continued)

(52) U.S. Cl.
CPC ............ *H04L 1/0027* (2013.01); *H04L 1/0028* (2013.01); *H04L 5/0023* (2013.01);
(Continued)

(58) Field of Classification Search
CPC . H04W 72/1284; H04L 5/003; H04L 1/0028; H04L 1/0027; H04L 5/0055; H04L 5/0057
USPC .................................................... 370/344, 343
See application file for complete search history.

(56) References Cited

U.S. PATENT DOCUMENTS

2006/0250944 A1* 11/2006 Hong et al. .................... 370/210
2008/0200196 A1   8/2008 Muharemovic et al.
2010/0098012 A1*  4/2010 Bala et al. ...................... 370/329

FOREIGN PATENT DOCUMENTS

JP   2006352382   12/2006
JP   2007251344    9/2007
(Continued)

OTHER PUBLICATIONS

NTT DoCoMo, "Multiplexing Schemes for UL Control Signals," R1-074287, 3GPP TSG-RAN WG1 Meeting #50bis, Oct. 2007.
(Continued)

*Primary Examiner* — Omer S Mian
(74) *Attorney, Agent, or Firm* — Lee, Hong, Degerman, Kang & Waimey

(57) ABSTRACT

The present invention relates to a method for transmitting control information by a terminal in a wireless mobile communication system using multiple uplink carriers. The method for transmitting control information comprises: multiplexing a first control information to be assigned to a first uplink control channel and a second control information to be assigned to a second uplink control channel; and transmitting the multiplexed first and second control information via an uplink channel that is allocated to one of the multiple uplink carriers. Here, the first uplink control channel and the second uplink control channel are respectively allocated to different uplink carriers.

7 Claims, 5 Drawing Sheets

(51) Int. Cl.
   *H04L 1/00*      (2006.01)
   *H04L 5/00*      (2006.01)
   *H04W 72/12*     (2009.01)
   *H04L 27/26*     (2006.01)

(52) U.S. Cl.
   CPC .......... *H04L 5/003* (2013.01); *H04W 72/1284* (2013.01); *H04L 1/0004* (2013.01); *H04L 5/001* (2013.01); *H04L 5/0057* (2013.01); *H04L 27/2602* (2013.01); *H04L 5/0055* (2013.01)
   USPC ............ 370/344; 370/341; 370/343; 370/310

(56) References Cited

FOREIGN PATENT DOCUMENTS

| | | |
|---|---|---|
| JP | 2008078900 | 4/2008 |
| KR | 1020060049749 | 5/2006 |
| KR | 1020080095712 | 10/2008 |
| KR | 1020080095742 | 10/2008 |
| WO | 2007148583 | 12/2007 |
| WO | 2008014275 | 1/2008 |

OTHER PUBLICATIONS

Ericsson, "Uplink Transmission of ACK/NACK for E-UTRA TDD", R1-071894, TSG-RAN WG1 LTE TDD Ad Hoc, Apr. 2007.

Nokia, "Framework for requirements related to the channel state information", R4-081559, 3GPP TSG-RAN WG4 Meeting #47bis, Jun. 2008, 4 pages.

State Intellectual Property Office of the People's Republic of China Application Serial No. 200980146858.6, Office Action dated Aug. 23, 2013, 6 pages.

LGE, "Draft CR for 36.213 of Clarification of misconfiguration of a periodic CQI and SR," 3GPP TSG-RAN1 Meeting #55, R1-084190, Nov. 2008, 3 pages.

LG Electronics, "Considerations on DL/UL Transmission in Asymmetric Carrier Aggregation," 3GPP TSG RAN WG1 Meeting #55, R1-084197, Nov. 2008, 5 pages.

Nokia, et al., "L1 control signaling with carrier aggregation in LTE-Advanced," 3GPP TSG-RAN WG1 Meeting #54bis, R1-083730, Sep. 2008, 7 pages.

Ericsson, et al., "ACK/NACK transmission on PUSCH for LTE TDD," 3GPP TSG-RAN1 Meeting #55, R1-084363, Nov. 2008, 8 pages.

Ericsson, "Introducing missing L1 parameters into 36.213," 3GPP TSG-RAN Meeting #54, R1-083059, Aug. 2008, 22 pages.

Editor (Motorola), "Update of 36.213," 3GPP TSG-RAN Meeting #51, R1-075110, Nov. 2007, 14 pages.

European Patent Office Application Serial Number 11178701.6 Search Report dated Nov. 10, 2014, 9 pages.

Qualcomm Europe, "Support of Concurrent Transmission of PUCCH and PUSCH in LTE-A Uplink," 3GPP TSG RAN WG1 #55bis, R1-090362, Jan. 2009, 3 pages.

European Patent Office Application Serial Number 09827744.5, Search Report dated Nov. 11, 2014, 8 pages.

\* cited by examiner

FIG. 1
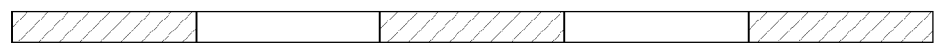
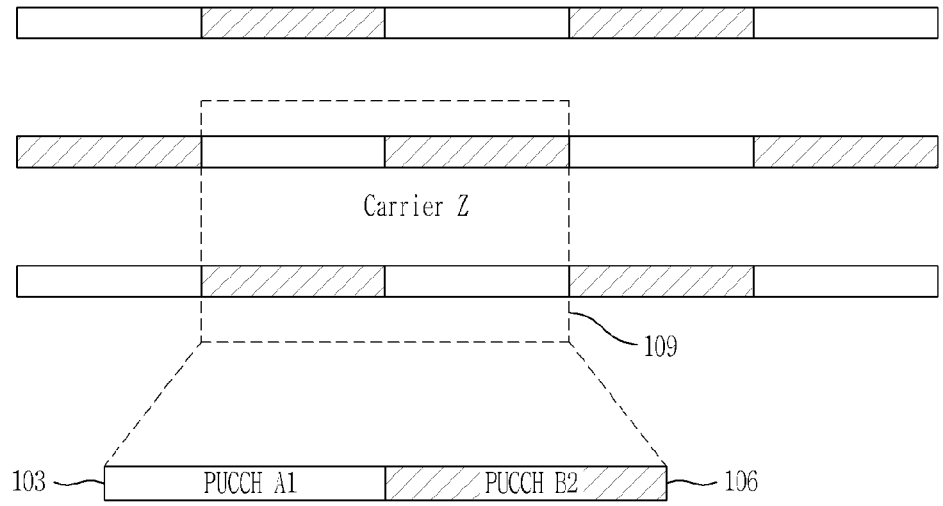
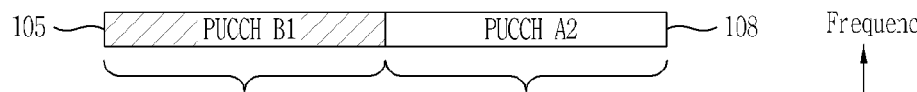
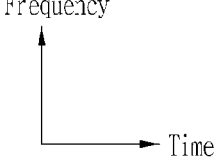

METHOD FOR TRANSMITTING CONTROL INFORMATION IN WIRELESS MOBILE COMMUNICATION SYSTEM

This application is the National Stage filing under 35 U.S.C. 371 of International Application No. PCT/KR2009/006829, filed on Nov. 19, 2009, which claims the benefit of earlier filing dated and right of priority to Korean Application No. 10-2009-0048497, filed on Jun. 2, 2009, and also claims the benefit of U.S. Provisional Application Ser. No. 61/117,220, filed on Nov. 23, 2008, the contents of which are all hereby incorporated by reference herein in their entirety.

TECHNICAL FIELD

The present invention relates to a wireless mobile communication system, and more particularly, to a method for transmitting control information.

BACKGROUND ART

In a wireless mobile communication system, as a UE (User Equipment) can move during communication in progress, a traffic channel environment may vary in time. Because a different communication scheme may be appropriate for each traffic channel environment, a BS (Base Station) needs to determine a specific communication scheme and signal the determined communication scheme to the UE on a control channel according to passage of time. The UE may transmit control information needed for the BS to determine the specific communication scheme to the BS on an uplink control channel.

When a control channel and a traffic channel are simultaneously transmitted, the BS can transmit them using all resources without any restriction because it can supply sufficient transmission power. On the other hand, when the UE is to transmit a control channel and a traffic channel at the same time, the waveform of a transmission signal may experience undesired distortion because the UE has limited transmission power and may not have good power amplifier characteristics. Especially in a 3GPP LTE ($3^{rd}$ Generation Project Partnership Long Term Evolution) system, a UE transmits a time-domain modulated signal in DFT-S-OFDM (Discrete Fourier Transform Spread Orthogonal Frequency Division Multiplexing) to maintain the single carrier property, for optimizing the power of the UE. Despite the advantage of a remarkable decrease in CM (Cubic Metric) or PAPR (Peak-to-Average Power Ratio), the DFT-S-OFDM scheme has the shortcoming that a transmission signal is transmitted only in a contiguous frequency band. This imposes a constraint on simultaneous transmission of a control channel and a traffic channel. Therefore, when a control channel and a traffic channel are simultaneously allocated to a UE, the control channel and the traffic channel are designed such that a signal to be transmitted on the control channel is relocated to the traffic channel.

With the above channel configuration, the single carrier property can be maintained but, in fact, signal coverage is decreased rather than it is extended or maintained. For example, if a transmission signal is to be transmitted on an uplink traffic channel in the presence of a control channel designed for transmission of an ACK/NACK (acknowledgment/negative-acknowledgment), an ACK/NACK bit is mapped to an OFDM symbol around an uplink demodulation reference signal in a conventional technology. As a result, power available to the UE for transmission of the ACK/NACK signal is reduced to or below a half of a maximum energy that can be accumulated in a single subframe. Accordingly, the technique taken for CM reduction only reduces the link coverage of the control channel. Moreover, a problem caused by mixture between information of the control channel and information of the traffic channel affects the robustness of a protocol.

The conventional method presents no security solution when a UE fails to receive a command, for example, a scheduling grant from a BS and causes obscurity according to a control channel type. For example, when the UE transmits a Scheduling Request (SR) or it transmits an RI (Rank Indicator) suitable for a current channel along with a CQI (Channel Quality Information), the BS is not aware of the transmission and thus performs blind detection. However, a protocol-related problem may still occur. The present invention relates to a technique for generating a signal, while correcting such an error.

DISCLOSURE

Technical Problem

An object of the present invention devised to solve the conventional problem is to provide a method for decreasing a transmission error rate and increasing capacity in wireless mobile communication.

Technical Solution

In an aspect of the present invention, a method for transmitting control information at a UE in a wireless mobile communication system using a plurality of uplink carriers includes multiplexing first control information allocated to a first uplink control channel with second control information allocated to a second uplink control channel, and transmitting the multiplexed first and second control information on an uplink channel allocated to one of the plurality of uplink carriers. The first and second uplink control channels may be allocated to different uplink carriers. Or the first and second uplink control channels may be allocated to the same uplink carrier.

The UE may use one or more SC-FDMA signals or clustered SC-FDMA.

The uplink channel may be an uplink control channel.

The multiplexing may include modulating a bit stream generated by sequentially arranging one or more bits representing the first control information and one or more bits representing the second control information according to a modulation order corresponding to the length of the bit stream.

If the bit stream is 2 bits, the modulation order may be QPSK, if the bit stream is 3 bits, the modulation order may be 8PSK, and if the bit stream is 4 bits, the modulation order may be 16QAM.

If the first control information requires a lower propagation error rate than the second control information, the first control information may be mapped to a bit robust against a propagation error in the bit stream.

The bit robust against a propagation error may be an MSB (Most Significant Bit) of the bit stream.

The uplink control channel may be divided into a plurality of subsets and each subset may include one or more SC-FDMA symbols. The first control information may be mapped to a first subset and the second control information may be mapped to a second subset, among the plurality of subsets.

If the first control information requires a lower error rate than the second control information, more pilots may be allocated to the first subset than to the second subset.

Each of the first and second control information may include at least one of an ACK, a NACK, an SR and a CQI.

In another aspect of the present invention, a method for transmitting control information at a UE in a wireless mobile communication system using SC-FDMA includes transmitting control information simultaneously on an uplink control channel and an uplink shared channel.

The control information may be an ACK or NACK.

The control information may be a CQI.

The control information may be an RI.

The control information may be a downlink carrier measurement. The measurement may be a CSI RS (Channel Status Information Reference Signal) measurement or a DM RS (DeModulation Reference Signal) measurement.

The control information may be a neighbor cell measurement. The measurement may be a CSI RS measurement of a DM RS measurement.

The control information may be a neighbor cell timing measurement. The timing measurement may be a measurement from a location RS, a synchronization channel, a CSI RS, a DM RS, etc.

The CQI may include first and second information.

The first information may be transmitted only on the uplink control channel and the second information may be transmitted only on the uplink shared channel.

The first information may be a PMI (Precoding Matrix Index) and the second information may be a wideband CQI.

The first information may be a wideband CQI and the second information may be a delta CQI.

The first information may be a CQI or PMI and the second information may be an RI (rank information).

The first information may be an RI and the second information may be a CQI or PMI.

The first information may be a feedback for a serving cell and the second information may be a feedback for a cooperative cell.

The first information may be a feedback for a first carrier and the second information may be a feedback for a second carrier.

Advantageous Effects

According to the wireless mobile communication method of the present invention, a transmission error rate can be decreased and capacity can be increased.

BRIEF DESCRIPTION OF THE DRAWINGS

FIG. 1 illustrates exemplary resource allocation when a PUCCH (Physical Uplink Control CHannel) is used together with a PUSCH (Physical Uplink Shared CHannel).

BEST MODE FOR CARRYING OUT THE INVENTION

Figure 2:
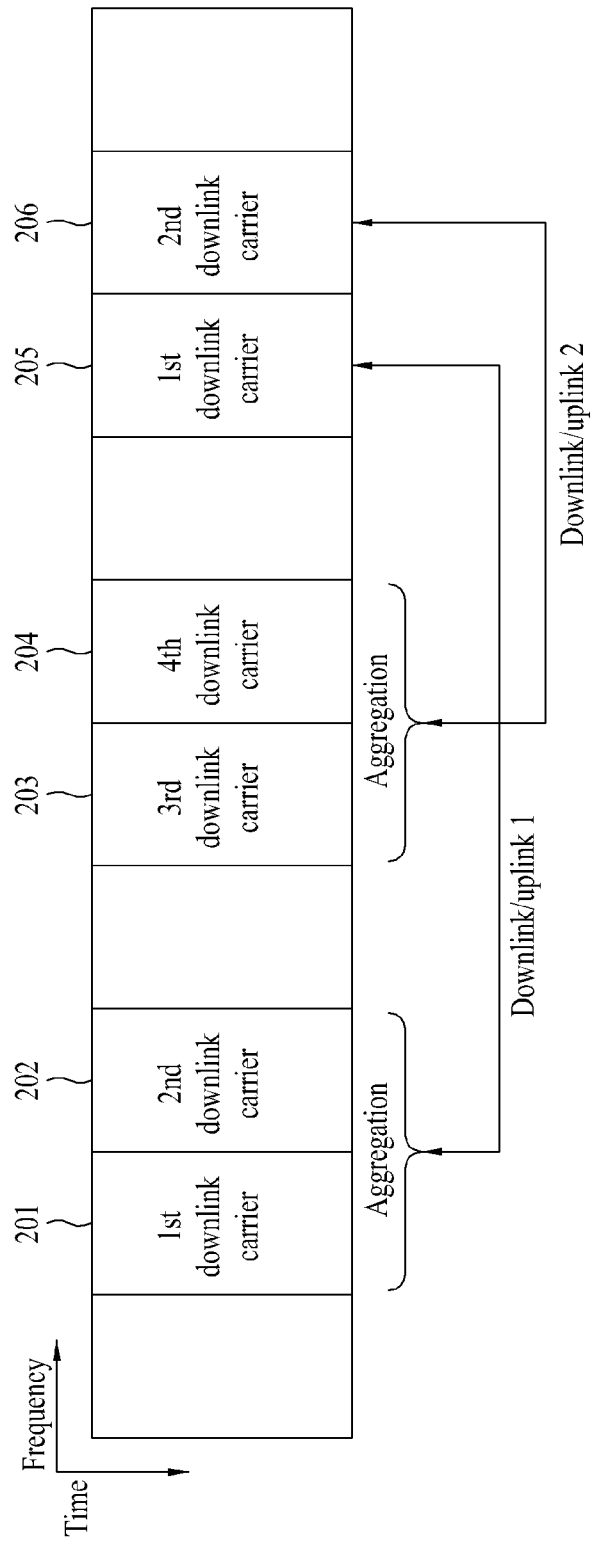
FIG. 2 illustrates exemplary carrier aggregation when four downlink carriers and two uplink carriers are used.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following description includes specific details in order to provide a thorough understanding of the present invention. However, it will be apparent to those skilled in the art that the present invention may be practiced without such specific details. For example, while the following description is made, centering on specific terms, the present invention is not limited to the specific terms. Even though the specific terms are replaced with arbitrary terms, they may mean the same. Like reference numbers will be used throughout this specification to refer to the same or like parts.

Through the specification, when it is said that some part "includes" a specific element, this means that the part may further include other elements, not excluding them, unless otherwise mentioned.

The technology of the present invention as set forth herein can be used for a variety of wireless communication systems. A wireless communication system for providing various communication services such as voice and packet data services is provided. A BS (Base Station) generally refers to a fixed station communicating with a UE (User Equipment) and is interchangeably used with a Node B, a BTS (Base Transceiver System), or an access point. An MS (Mobile Station) is fixed or mobile, also referred to as a UE, a UT (User Terminal), an SS (Subscriber Station), or a wireless device.

FIG. 1 illustrates exemplary resource allocation when a PUCCH (Physical Uplink Control CHannel) is used together with a PUSCH (Physical Uplink Shared CHannel).

In FIG. 1, a set of uplink carriers, Carrier X, Carrier Y and Carrier Z is shown. Each box arranged along the time axis, for example, each of reference numerals 101 and 102 denotes a slot in the time domain. Two slots form one subframe. That is, a dotted region 109 of FIG. 1 represents one subframe in the time domain. A PUCCH 103 (PUCCH A1) and a PUCCH 108 (PUCCH A2) form one PUCCH, a PUCCH 105 (PUCCH B1) and a PUCCH 106 (PUCCH B2) form another PUCCH, and a PUSCH 104 (PUSCH C1) and a PUSCH 107 (PUSCH C2) form a PUSCH. PUSCH C1 is spaced from PUSCH C2 in the frequency domain, which results in a frequency diversity effect. The same thing applies to the PUCCHs. That is, a diversity effect can be achieved through frequency hopping between slots for one channel.

Resource allocation as illustrated in FIG. 1 is applicable to both cases of a single carrier and multiple carriers. The concurrent use of a control channel and a traffic channel may occur on multiple carriers.

While the present invention is described, centering on the PUCCH and PUSCH of 3GPP LTE, the present invention can also be applied to any system that transmits control information on a traffic channel as well as the 3GPP LTE system. The present invention is also applicable to a carrier aggregation environment in which one or more PUCCHs and one or more PUSCHs are available. Carrier aggregation refers to aggregation between a plurality of uplink carriers and one or more downlink carriers or aggregation between a plurality of downlink carriers and one or more uplink carriers.

FIG. 2 illustrates exemplary carrier aggregation when four downlink carriers 201 to 204 and two uplink carriers 205 and 206 are used. In this example, each uplink carrier is aggregated with two downlink carriers. More specifically, first and second downlink carriers 201 and 202 are aggregated with a first uplink carrier 205, and third and fourth downlink carriers 203 and 204 are aggregated with a second uplink carrier 206. That is, a downlink signal may be transmitted on the first or second downlink carrier 201 or 202 to a UE using the first uplink carrier 205, and a downlink signal may be transmitted on the third or fourth downlink carrier 203 or 204 to a UE using the second uplink carrier 206.

Preferably, a control channel transmission scheme is designed so as to satisfy QoS (Quality of Service) that can be generally ensured, with priority. In general, the control channel transmission scheme is designed such that a control channel has a very low error probability, for instance, in a range of 0.001 to 0.01. On the other hand, the error probability of a traffic channel is set to be as high as 10 to 20% to increase system throughput. In practice, the best system throughput can be achieved in this case. Considering that the 100 or more times difference between the error probability requirements of the control channel and the traffic channel, simple transmission of a control signal on the traffic channel does not ensure the QoS requirement and signal coverage of the system. Moreover, a high error probability may cause errors in a protocol required for system operations. To avert this problem, a method for appropriately transmitting data and/or control information on each PUCCH and PUSCH combination, for example, in the 3GPP LTE system, particularly the LTE-A system.

As to a UE conforming to LTE Release 8, when a PUCCH and a PUSCH are simultaneously allocated on the same carrier, the UE transmits information of the PUCCH on the PUSCH. On the side of the system, the PUCCH resources are wasted. In the LTE-A system, the PUCCH may be used for another usage. Specifically, since information supposed to be delivered in PUCCH resources allocated to a particular UE is actually transmitted on a PUSCH, the PUCCH resources are unused. These unused PUCCH resources may be allocated to another UE. The present invention provides a method for, when a PUCCH and a PUSCH are simultaneously allocated to a UE, enabling the UE to use both the allocated PUCCH and PUSCH. The method is also applicable when the PUCCH or the PUSCH is independently allocated to the particular UE.

Now a description will be given of a method for transmitting an ACK/NACK signal on uplink according to an embodiment of the present invention.

This embodiment is based on the assumption that when a UE is supposed to receive downlink traffic (data or a command) from a BS and transmit a PUCCH ACK/NACK for the received downlink traffic to the BS, the UE is additionally allocated PUSCH resources for traffic transmission. An ACK is a feedback signal transmitted from a second device to a first device, indicating successful reception of a signal from the first device in a wireless mobile communication system. A NACK is a feedback signal transmitted from the second device to the first device, indicating reception failure of a signal from the first device.

When the UE successfully receives a command from the BS, there is no protocol obscurity because a PUSCH transmission format expected by the BS is identical to the transmission format of a PUSCH transmitted by the UE. However, if the UE fails to decode downlink allocation information on a PDCCH from the BS, the UE has no reason for transmitting an ACK/NACK signal to the BS. As a consequence, a PUSCH transmission format expected by the BS is different from the transmission format of a PUSCH transmitted by the UE. In this case, a protocol mismatch occurs at the physical layer.

Conventionally, no method for solving problems encountered with transmission or non-transmission of an ACK/NACK signal has been specified. Delivery of information of a PUCCH on a PUSCH through puncturing as is done in the current LTE system causes the above problem. To avert this problem, one of Methods A-1, A-2, A-3 and A-4 as described below can be used.

Method A-1: The UE does not transmit an ACK/NACK signal on a PUSCH at all. Rather, the UE transmits an ACK/NACK signal on a PUCCH. Since there is no room for different interpretations of a PUSCH at the UE and the BS, no protocol problem occurs. Herein, an ACK/NACK signal is transmitted on a PUCCCH and the BS processes the ACK/NACK signal separately. This ACK/NACK transmission scheme does not cause a problem to a downlink/uplink protocol. In a system using a plurality of downlink or uplink carriers, for example, in the LTE-A system, a plurality of ACK/NACK signals should be transmitted for downlink data received on the downlink carriers. Therefore, ACK/NACK transmission takes place only on a PUCCH. In the presence of a plurality of PUCCHs, individual ACK/NACK signals may be transmitted independently on PUCCHs of uplink carriers. Meanwhile, ACK/NACK bits in a plurality of PUCCH resources may be bundled through joint-coding of the plurality of PUCCHs. ACK/NACK information transmitted on the best PUCCH selected from the plurality of PUCCHs may be information created by bundling a plurality of ACK/NACK bits at a time in the above manner. That is, when a PUSCH and a PUCCH are simultaneously transmitted, an ACK/NACK may always be transmitted on an independent control information transmission channel, PUCCH in the LTE-A system. On the other hand, ACK/NACK information is always transmitted on a PUSCH in a system using a single uplink carrier and a single downlink carrier such as the LTE system.

Method A-2: The UE transmits an ACK/NACK signal on a PUCCH and transmits an ACK/NACK and traffic together on a PUSCH. Then the BS can determine from a signal received on the PUCCH whether the UE performed downlink processing (i.e. DTX or not) and reduce problems associated with signal coverage, caused by transmission of an ACK/NACK on a PUSCH. That is, energy information of the PUCCH may be a criterion by which to determine whether the UE has decoded a PDCCH and by which to determine whether ACK/NACK information is included in the PUSCH. Symbol information of the PUCCH may offer a combining gain or frequency diversity, in combination with symbol information of the PUSCH. When control information is transmitted simultaneously on a control channel (PUCCH) and a traffic channel (PUSCH), the protocol mismatch that may occur between the UE and the BS can be solved. In a carrier aggregation system where a plurality of carriers are aggregated, some of a plurality of ACKs/NACKs may be transmitted on a PUSCH and other ACKs/NACKs may be transmitted on a PUCCH. In this manner, a symbol space can be extended.

Method A-3: When an ACK/NACK is to be transmitted, no traffic is transmitted on a PUSCH. As the PUSCH is not transmitted, limited transmission power is saved. If the extra transmission power is used for a control channel, the coverage of the control channel may be extended. This method is preferably used when cell signal coverage is an issue.

Method A-4: If a plurality of PUCCHs are allocated across a plurality of carriers, all ACKs/NACKs to be transmitted on the plurality of PUCCHs are transmitted collectively on a single carrier. When a PUSCH has been allocated, the ACKs/NACKs are transmitted on the PUSCH. Meanwhile, if a PUCCH capable of transmitting a large number of bits has been allocated, all ACKs/NACKs are transmitted on the PUCCH. For example, all ACKs/NACKs may be transmitted on a PUCCH carrying information such as a CQI. That is, in a carrier aggregation system where a plurality of carriers are aggregated, ACKs/NACKs supposed to be transmitted on a plurality of PUCCHs may be transmitted on a single carrier rather than they are transmitted on control channels of a plurality of carriers. When ACKs/NACKs are transmitted on a plurality of carriers, a PAPR/CM problem may occur. The reduction of propagation coverage caused by the PAPR degradation can be prevented by transmitting the ACKs/NACKs through a single PUSCH on a single carrier or through a PUCCH with a new format on a single carrier.

Now a description will be given of a method for transmitting a CQI on uplink according to another embodiment of the present invention.

A CQI is feedback control information that a UE transmits to a BS, which generically refers to a measure of the quality of a communication channel between the BS and the UE. The CQI may be a measurement about a serving cell or a cooperative/neighbor cell. The CQI may be a measurement for one or more carriers. The BS performs control operations based on the feedback CQI. When a CQI is transmitted on a PUCCH, the CQI transmission may be periodic or aperiodic. In the former case, the CQI may be transmitted successively at corresponding positions in the form of bursts. That is, CQI values of a plurality of carriers or CQI values of a plurality of neighbor cells may be transmitted successively in time, frequency, or PUCCH resources. In this case, a PUSCH and the PUCCH are highly likely to be transmitted simultaneously. In the presence of a PUSCH, a CQI supposed to be transmitted on the PUCCH may be relocated to the PUSCH. Herein, the transmitted data includes a wideband CQI and PMI (Precoding Matrix Index) for each rank or layer. Except for initial CQI transmission, the BS may know in advance whether the UE will transmit a CQI. Therefore, when a signal is transmitted on a PUSCH between a UE and a BS, there is no obscurity on a transmission format. In this case, accordingly, there is no need for transmitting CQI especially on a PUCCH.

However, to maintain the reliability of a PUCCH signal and/or to prevent the increase of the effective code rate of an uplink SCH (Shared CHannel), the CQI may be separately transmitted on the PUCCH.

As done in the above-described first embodiment of the present invention, the CQI may be transmitted on both the PUCCH and the PUSCH or only on the PUCCH. When it is not preferable to transmit a CQI, only uplink traffic without a CQI may be transmitted on the PUSCH. CQI values of different measurement targets may be delivered on the PUSCH and the PUCCH, respectively. For example, a CQI value for a serving cell or a first carrier may be transmitted on the PUSCH and a CQI value for a neighbor cell or a second carrier may be transmitted on the PUCCH, or vice versa. If CQI values to be transmitted are jointly encoded into a single codeword, the codeword may be transmitted over a symbol space including the PUSCH and the PUCCH.

A CQI may include actual channel information such as a CSI (Channel State Information), an MCS (Modulation and Coding Scheme), a PMI, an RI (rank information), a wideband CQI, a subband/subband delta CQI, a carrier/carrier delta CQI, a codeword delta CQI, etc. The CSI may be a channel matrix, the PMI is a parameter indicating a specific precoding matrix in a system using precoding matrices, and the RI indicates a rank value in a system with a plurality of transmission and reception antennas. The subband delta CQI is the difference between a CQI value for each of a plurality of subbands divided from a frequency band and a particular reference CQI value. The wideband/subband CQI is a CQI value for a given frequency band (a total band or a subband divided from the total band). The codeword CQI is a CQI value for a codeword and the codeword delta CQI is the difference between the CQI values of codewords. The carrier CQI and the carrier delta CQI are a CQI value for a downlink carrier and the difference between a CQI value of a carrier and a CQI value of a predetermined reference carrier (e.g. a primary carrier CQI). Similarly, a CQI value for a neighbor cell/cooperative cell may be defined as an absolute CQI value for each cell, or a delta CQI for a neighbor cell/cooperative cell may be defined as the difference from the CQI of a reference cell (e.g. the serving cell). One thing to note herein is that the above information included in a CQI is purely exemplary and thus is not limited to any specific definition.

If a CQI can be separated into different pieces of information as described above, the CQI may be transmitted separately. A UE may transmit part of specific pieces of information that form a CQI. For instance, if a wideband CQI and a PMI are transmitted together, the wideband CQI and the PMI may be transmitted on a PUSCH and a PUCCH or on a PUCCH and a PUSCH, respectively. In another example, if a wideband CQI, a subband delta CQI, and a codeword delta CQI are transmitted together in a subframe, they may be separately transmitted on the PUSCH and the PUCCH. For example, the wideband CQI may be transmitted on the PUCCH and the delta CQIs may be transmitted on the PUSCH, or in any other way.

If the CQI includes an RI, the RI may be transmitted on the PUCCH and the transmission format of a PUSCH may be determined based on the RI. In this case, the RI can be read from the PUCCH with higher accuracy than it is read from the PUSCH, thereby preventing a decoding error at the BS. In the opposite case, the RI may be transmitted on the PUSCH, while other information of the CQI may be transmitted on the PUCCH. That is, since the information amount of the CQI/PMI varies according to the RI, the basic part, for example, the RI may be transmitted on the PUSCH to thereby keep the size unchanged, while the other part, for example, the CQI/PMI may be transmitted on a channel (i.e. the PUCCH) other than the PUSCH.

A method for transmitting an RI on uplink according to another embodiment of the present invention will be described below.

If an RI and a PUSCH are to be transmitted simultaneously, the simultaneous transmission of the RI and PUSCH may be pursuant to the afore-described first embodiment of the present invention. Especially since the RI is a significant factor that affects system operations, a protection scheme against errors should be provided for the RI and more transmission energy needs to be allocated to the RI, rather than the RI is integrated into the PUSCH. The conventional technology regulates transmission of an RI on the PUSCH irrespective of the type of information transmitted on the PUSCH. However, if the RI is transmitted on the PUSCH, protection of the RI against errors is limited.

Therefore, a mechanism for selecting RI transmission on the PUCCH or RI transmission on the PUSCH can be used, as done in the first embodiment of the present invention. When the RI is transmitted on the PUCCH, power allocation is facilitated at a transmitter and as a result, the RI can be transmitted accurately.

When the RI is transmitted, the PUSCH and a CQI are preferably transmitted together. If the RI is changed, the range of a necessary CQI is also changed. Therefore, the BS may perform scheduling more appropriately, when the PUSCH and the CQI are transmitted together at the time when the RI is transmitted.

However, in the case where the RI and the CQI/PMI are transmitted in the same subframe as described above, it may be contemplated that the RI is first detected from the PUCCH and then the CQI/PMI and data are decoded from the PUSCH. Herein, the RI is not transmitted on the PUSCH.

If the RI is transmitted on the PUSCH, symbols carrying the RI may be power-boosted. That is, to reduce an error rate, the RI symbols can be transmitted with higher power than other data or other control channel symbols.

In the LTE-A system, the bit number of an RI may be increased. The use of a conventional method used in the LTE system may lead to lack of a symbol space for RI transmission. Accordingly, to transmit one additional RI bit, the RI may be transmitted on the PUSCH as done conventionally, with an added RI bit space allocated to the PUCCH. Or the RI is transmitted on the PUCCH, with an added RI bit space allocated to the PUSCH. Meanwhile, if the RI is transmitted in a new bit-symbol structure, it is preferred to transmit the entire RI on the PUCCH or the PUSCH. If the RI is transmitted on the PUCCH, the PUCCH may be configured so as to accommodate the RI with an increased number of bits by increasing a modulation order or applying a technique such as differential modulation on a symbol, RS (Reference Signal), or slot basis.

A description will be given of a method for transmitting an SR on uplink according to another embodiment of the present invention.

An SR may be transmitted together with or separately from other control signals. If the UE can tolerate a slight delay in transmitting information about new data to the BS, transmission of an SR in the next transmission opportunity does not cause problems. If traffic is transmitted on the PUSCH, a higher layer indicates a buffer status. Thus, resources may be continuously allocated to the current transmission traffic. However, when a new HARQ (Hybrid Automatic Repeat request) process is to be started, it may be difficult to start the new HARQ process simply with the knowledge of the buffer status.

In this case, when the SR and the PUSCH are transmitted simultaneously, this event may be set by generating an HARQ process other than the current process transmitted on the PUSCH, while transmitting the SR on the PUCCH, or by transmitting the SR on the PUCCH to deliver additional information about the current traffic process, rather than the SR is not transmitted at all. If the PUSCH is piggybacked with the SR, additional information about the SR may be transmitted on the PUCCH, or vice versa. That is, while the LTE system cannot describe additional information such as a buffer status, emergency, QoS, etc. while transmitting an SR, this additional information can be transmitted in an extra symbol space. On the whole, the SR can be configured to be transmitted always on the PUCCH, compared to other control information.

A method for transmitting control information on PUCCHs already defined in the conventional wireless mobile communication system and/or a newly defined PUCCH according to a further embodiment of the present invention will be described.

This embodiment pertains to a method for configuring a PUCCH or a PUSCH applicable to the LTE-A system. Compared to the LTE system, the LTE-A system should extend a symbol space due to the increase of the bit number of control information. Thus a PUCCH or a PUSCH needs to be designed to meet the requirement. According to the embodiment of the present invention, an LTE-A control channel carrying more control information can be configured by extending the symbol space.

If information of the PUCCH is relocated to the PUSCH, the already-allocated PUCCH resources are not used. The PUCCH can deliver 1 to 20 bits of information. Especially when the allocated PUCCH resources are supposed to deliver an ACK/NACK, the PUCCH resources may carry up to 3 bits. If the PUCCH resources are supposed to carry a CQI, they may deliver up to 20 bits. However, a larger symbol space may be needed according to a used resource utilization scheme, extension of control information through a multi-carrier or multi-cell operation, a diversity scheme for increasing coverage or reliability, spatial multiplexing, a modulation order, etc. Accordingly, a method for transmitting more control information may be considered for the 3GPP LTE system, when the PUCCH and the PUSCH are transmitted together in a situation where an LTE-A UE and an LTE-UE are co-existent.

Aside from the method for transmitting control information both on the PUCCH and on the PUSCH, a method for transmitting control information only on the PUCCH may be considered for LTE-A control information. For example, if a UE reports a CQI for eight antennas (antenna 0 to antenna 7) in the LTE-A system, the UE needs more CQI bits to report the CQI for the 8 antennas, compared to the LTE system where the UE has only to report CQI for 4 antennas. As to an RI, the UE may include additional rank indication bits in the PUCCH in order to represent an additional rank (in the case where a rank definition is extended in view of the increased number of antennas). The most important part/bit(s) of the RI may be transmitted on the PUCCH. In a multi-cell operation, interference measurements for neighbor cells are transmitted on the PUCCH. The BS may use the interference measurements to indicate a particular cell at the moment the BS attempts to communicate with the UE. An interference measurement may take the form of a CQI including a path loss, a PMI, an MCS, a CSI, an RI, etc. The BS may indicate an arbitrary number of cells from among cells having the strongest interference or cells having the smallest interference.

If the UE indicates a particular cell on its own, it may transmit the cell ID of the particular cell directly, in a neighbor cell list, or in a bitmap representing respective cells, encoded/modulated in a PUCCH format. The interference measurement and cell ID may be simultaneously transmitted.

In case of carrier aggregation, information about a selected carrier may further be transmitted. That is, an indication requesting relocation from a current carrier to another carrier may be transmitted. This indication may take the form of a relocation request or a particular carrier ID/bitmap. With carriers aggregated, CQIs for other carriers may be transmitted. Such a CQI may include a PMI, an RI, a CSI, an MCS, etc.

As described before in Method A-4, if possible, a plurality of control channels transmitted simultaneously on a plurality of carriers may be integrated. For example, when an ACK/NACK is allocated to an uplink carrier and an SR is configured on another uplink carrier, the ACK/NACK and the SR may be transmitted in combination. When a CQI is allocated to an uplink carrier and an ACK/NACK or SR is allocated to another uplink carrier, the ACK/NACK or SR may be transmitted on a PUCCH of the carrier carrying the CQI.

Control information may be integrated irrespective of the number of uplink carriers. If control information to be integrated can be transmitted on a single PUCCH according to a PUCCH transmission format, the integration method may be further extended.

For example, it is assumed that there are two uplink carriers each carrying an ACK/NACK and a third carrier carries a CQI. Then the CQI and the ACKs/NACKs may be transmitted in QPSK (Quadrature Phase Shift Keying) on the carrier for the CQI. That is, QPSK symbols may be overlapped on the CQI or an ACK/NACK symbol may be mapped to a symbol space created by puncturing one of CQI symbols. Or some code bits may be used for an ACK/NACK indication as described below. More ACKs/NACKs may be transmitted by extending the above scheme as far as modulation permits.

In another example, when an SR and an ACK/NACK are transmitted simultaneously, the SR and the ACK/NACK can be transmitted in combination on one PUCCH because both information of the SR and the ACK/NACK can be transmitted in BPSK (Binary Phase Shift Keying) or QPSK.

In both cases where a plurality of control signals are transmitted together on a PUCCH and a control signal and a traffic signal are simultaneously controlled on a PUSCH, control signals can be transmitted in the following manner.

Figure 3:
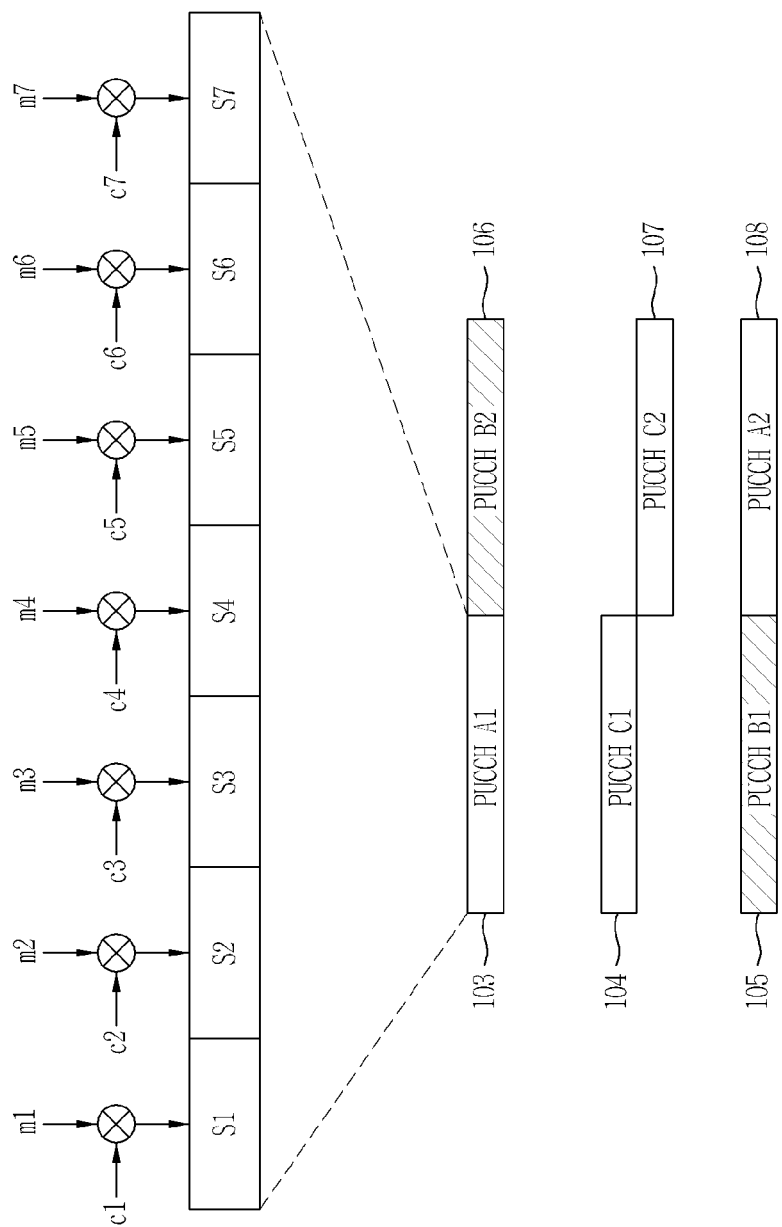
FIG. 3 is a view illustrating a general processing structure for transmitting a message on a PUCCH, referred to for describing the present invention.

FIG. 3 is a view illustrating a general processing structure for transmitting a message on a PUCCH, referred to for describing the present invention.

Referring to FIG. 3, reference characters S1, S2, ..., S7 represent OFDM symbols. The total number of OFDM symbols in a slot may vary depending on a CP length or any other configuration. For example, the number of OFDM symbols in a slot may be reduced to 6 or 3 in case of an extended CP. In a Multicast Broadcast Single Frequency Network (MBSFN) configuration, if a particular uplink OFDM symbol is used for any other specific purpose, the total length of a control channel may be changed. Herein, it is assumed that 7 OFDM symbols in total are available. The OFDM symbols are masked by a UE-specific value C1, C2, ..., C7 and a message to be transmitted, M1, M2, ..., M7. C1, C2, ..., C7 may be divided into any number of subsets and the message M1, M2, ..., M7 may also be divided according to a sequence applied to C1. For a set with subsets of C (e.g. {C1, C2} or {C1, C2, C6, C7}), corresponding message symbols have the same value (e.g. M1=M2 or M1=M2=M6=M7). Reference symbols having a preset message value may be defined as pilots. However, to transmit additional information, a particular combination (e.g. an OFDM symbol combination within the same slot or in different slots) may be used for message transmission and pilot transmission. A particular bit/code sequence or symbol sequence may be applied to symbols to be used as reference symbols on a slot basis or a subframe basis in order to transmit a message. The message is preferably error-tolerant such as an SR. When a plurality of control messages are transmitted on a single PUCCH, the PUCCH may occupy one PUCCH region, or the PUCCH may be configured across two slots, for example, in the forms of PUCCH A1+PUCCH A2, PUCCH A1+PUCCH B2, PUCCH B1+PUCCH B2, or PUCCH B1+PUCCH A2, as illustrated in FIG. 3. In relation to the PUCCH configuration, a message may be defined on a slot basis or across two slots.

Each message may include information of a plurality of control channels by increasing a modulation order according to a corresponding PUCCH configuration. For example, if a small amount of control information such as {ACK/NACK, SR, RI} is transmitted, the control information may be delivered in a predetermined bit number. For example, the control information may be transmitted in the order of important information, ACK/NACK>RI>SR or in the order of robust bits ACK/NACK>SR>RI. For example, PUCCH information may be combined according to a modulation order as illustrated in Table 1.

TABLE 1

| Modulation order | In bit information combination {A:B}, A is more robust than B (e.g. MSB(Most Significant Bit) is more robust) |
|---|---|
| BPSK | {ACK/NACK}, {RI}, {SR} |
| QPSK | {ACK/NACK}, {RI}, {SR}, {ACK/NACK:RI}, {ACK/NACK:SR}, {RI:SR} |
| 8PSK | {ACK/NACK}, {RI}, {SR}, {ACK/NACK:RI}, {ACK/NACK:SR}, {RI:SR} |
| 16 QAM | {ACK/NACK}, {RI}, {SR}, {ACK/NACK:RI}, {ACK/NACK:SR}, {RI:SR}, {ACK/NACK:RI:SR}, {ACK/NACK:SR:RI} |

Table 1 lists a variety of cases in which a small amount of control information is combined into a PUCCH through modulation.

In Table 1, {A:B} represents a combination of information A and information B. Another information C may be added to {A:B}. Then, the control information combination may be represented as {A:B:C} for 16QAM as a modulation order in Table 1.

In BPSK, only 1 bit can be transmitted. Therefore, two or more pieces of information cannot be combined and only 1-bit information can be transmitted.

In QPSK, 2 bits can be transmitted and thus up to two pieces of information can be combined. Preferably, the sum of the bit numbers of combined information is 2. If one piece of information is transmitted, the information may be 2 bits long. For example, in case of {ACK/NACK}, the ACK/NACK may have a size of 2 bits. In case of a two-information combination, each piece of information may be 1 bit long. For instance, in case of {RI:SR}, the RI may be 1 bit and the SR may be 1 bit.

8PSK allows 3-bit transmission and thus up to three pieces of information can be combined in 8PSK. Preferably, different pieces of information are combined into 3 bits. For example, in case of {ACK/NACK}, the ACK/NACK is 3 bits. If two pieces of information are combined in 8PSK, one piece of information is 1 bit and the other piece of information is 2 bits. For example, in case of {RI:SR}, the RI and the SR may be 2 bits and 1 bit long, respectively, or the RI and the SR may be 1 bit and 2 bits long, respectively. If three pieces of information are combined in 8PSK, each piece of information is 1 bit long.

16QAM allows 4-bit transmission and thus up to four pieces of information can be combined. Preferably, different pieces of information are combined into 4 bits. If one piece of information is transmitted, the information may be 4 bits. For example, in case of {ACK/NACK}, the ACK/NACK is 4 bits. If two pieces of information are combined in 16QAM, one piece of information is 1 bit and the other piece of information is 3 bits, or each piece of information is 2 bits. For example, in case of {RI:SR}, the RI and the SR may be 3 bits and 1 bit long, respectively, the RI and the SR may be 1 bit and 3 bits long, respectively, or each of the RI and SR may be 2 bits long. If three pieces of information are combined in 16QAM, one piece of information is 1 bit long, another piece of information is 1 bit long, and the other piece of information is 2 bits long. For example, for {ACK/NACK:SR:RI}, one of the ACK/NACK, SR and RI is 2 bits and each of the other pieces of information is 1 bit. If four pieces of information are combined in 16QAM, each piece of information is 1 bit long.

When any other combination than illustrated in Table 1 is to be transmitted on the PUCCH, control information may be mapped to robust bits according to information importance in a similar manner.

In another embodiment of the present invention, information may be applied on a subset basis, each subset including OFDM symbols on a PUCCH, as described before. That is, the OFDM symbols of the PUCCH are divided into a plurality of subsets, each subset including one or more OFDM symbols. If a plurality of pieces of control information are to be transmitted, each piece of control information may be mapped to a subset. Since robustness depends on the size of a subset, when different pieces of control information are transmitted simultaneously, the control information may be transmitted by matching the importance of each message to a subset size. Herein, it may be assumed that pilots are uniformly distributed. For the same subset size, a subset nearer to pilots is more robust.

Figure 4:
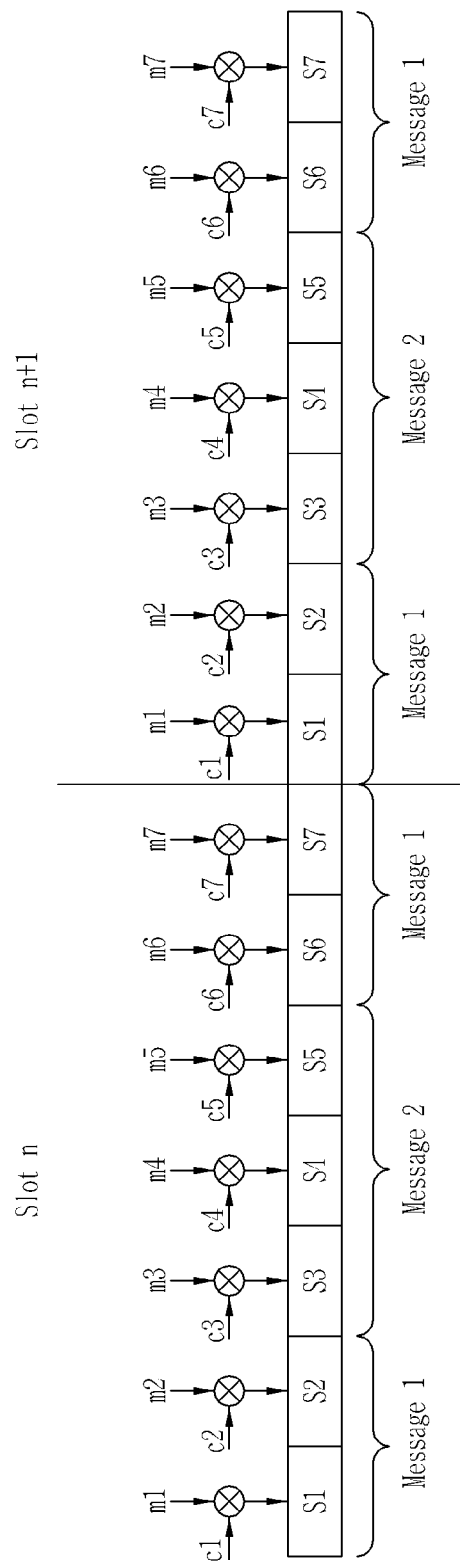
FIG. 4 illustrates an example of configuring OFDM (Orthogonal Frequency Division Multiplexing) symbol subsets for transmitting a plurality of messages according to an embodiment of the present invention.

FIG. 4 illustrates an exemplary OFDM symbol subset configuration for transmitting a plurality of messages according to an embodiment of the present invention.

Referring to FIG. 4, each slot may be divided into a plurality of OFDM subsets. Both cases where each slot delivers the same information and different pieces of information may be considered herein. That is, two successive slots may deliver the same or different information. An m value representing a message may be coherent information such as a BPSK, QPSK, 8PSK, or 16QAM value, but may be a non-coherent value such as zero. Coherent information refers to information or a symbol that is generated according to a modulation order and non-coherent information refers to information or a symbol that is not generated according to a modulation order. While message 1 and message 2 are allocated at a symbol ratio of 4:3 in FIG. 4, the symbol ratio may be any other value such as 5:2, 4:2:1, 3:3:1, etc.

Meanwhile, if a large number of bits as included in a CQI are to be transmitted, each control channel value may be subjected to joint coding. If an extra bit space remains when a codeword is created through joint coding or codewords representing respective control channels are inserted into one symbol space, part of the control information, that is, information bits may be repeated in the extra bit space. If an extra symbol space remains, symbols of a particular codeword may be repeated and inserted into the symbol space. In this case, each piece of control channel information may be encoded in a conventional manner. For example, if subsets {ACK/NACK, RI, SR} are transmitted in a CQI transmission scheme (i.e. after channel encoding, control information is mapped to messages m1, m2, ..., m7, m1', m2', ..., m7'), the messages of the control information are arranged in bits and then encoded. Herein, channel encoding may be performed after corresponding bits are repeated and included according to the importance of each piece of control information.

Figure 5:
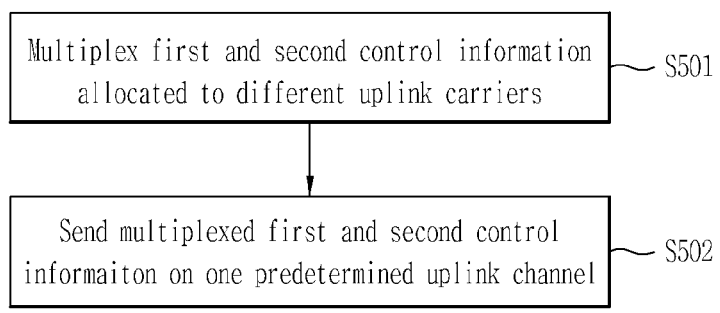
FIG. 5 is a flowchart illustrating a method for transmitting control information at a UE (User Equipment) in a wireless mobile communication system using a plurality of uplink carriers according to an embodiment of the present invention.

FIG. 5 is a flowchart illustrating a method for transmitting control information at a UE in a wireless mobile communication system using a plurality of uplink carriers according to an embodiment of the present invention.

Referring to FIG. 5, a wireless mobile communication terminal multiplexes first control information and second control information allocated to different uplink carriers (S501) and transmits the multiplexed first and second control information on a predetermined uplink channel (S502). The first and second control information may be an ACK/NACK, an RI, an SR, CQI, etc. The first control information is control information allocated to a first uplink control channel of a first uplink carrier and the second control information is control information allocated to a second uplink control channel of a second uplink carrier. As the first and second control information is transmitted on the predetermined single uplink channel, the first and/or second uplink control channel may not be transmitted. The predetermined single uplink channel may be the first or second uplink control channel, or a third uplink control channel allocated to a third uplink carrier.

While not shown in FIG. 5, the multiplexing step (S501) may involve modulating a bit stream generated by sequentially arranging one or more bits of the first control information and one or more bits of the second control information according to a modulation order corresponding to the length of the bit stream. If the bit stream is 2 bits long, the modulation order corresponding to the bit stream length is QPSK. If the bit stream is 3 bits long, the modulation order corresponding to the bit stream length is 8PSK. If the bit stream is 4 bits long, the modulation order corresponding to the bit stream length is 16QAM. If the first control information requires a lower propagation error rate than the second control information, the first control information may be mapped to bits robust against propagation errors in the bit stream. In general, a bit robust against a propagation error is set as, but not limited to, the MSB (Most Significant Bit) of the bit stream. If the first control information requires a lower error rate than the second control information, more pilots may be preset for a first subset than for a second subset.

According to the method of FIG. 5, the uplink control channel includes a plurality of subsets, each subset having one or more SC-FDMA symbols. The first control information may be mapped to the first subset and the second control information may be mapped to the second subset, from among the plurality of subsets. For a UE using OFDMA, not SC-FDMA, each subset may include one or more OFDMA symbols.

Figure 6:
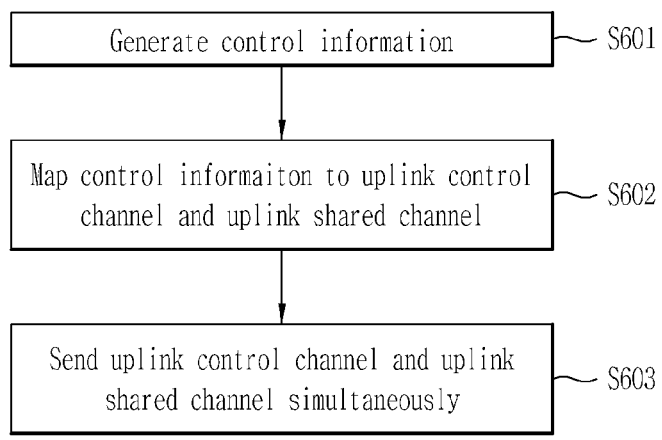
FIG. 6 is a flowchart illustrating a method for transmitting control information at a UE in a wireless mobile communication system according to another embodiment of the present invention.

FIG. 6 is a flowchart illustrating a method for transmitting control information at a UE in a wireless mobile communication system using a plurality of uplink carriers according to another embodiment of the present invention.

Referring to FIG. 6, a UE in the wireless mobile communication system generates control information (S601), maps the control information to both an uplink control channel and an uplink shared channel transmitted simultaneously with the uplink control channel (S602), and simultaneously transmits the uplink control channel and the uplink shared channel (S603). The control information may be one of an ACK, a NACK, a CQI, an RI, etc. If the control information includes a CQI, the CQI may contain at least two different pieces of information, that is, first and second information. The first information may be transmitted only on the uplink control channel and the second information may be transmitted only on the uplink shared channel. The first and second information may be a PMI and a wideband CQI, a wideband CQI and a delta CQI, a CQI/PMI and an RI, or an RI and a CQI/PMI, respectively.

The above description is applicable to simultaneous transmission of a plurality of data or a plurality of pieces of control information on a plurality of uplink carriers as well as on a single uplink carrier.

If information is transmitted on a PUCCH in the above-described manner, there is no problem with the single carrier property. However, if the PUCCH is transmitted together with a PUSCH, or PUCCHs are transmitted on the same carrier or different carriers, a PAPR/CM problem may occur. To prevent or mitigate this problem, a kind of masking sequence may be applied to each contiguous period. That is, a masking sequence may be applied to the same PUCCH/PUSCH (i.e. a transmission resource block is multiplied by a predetermined constant value) so as to decrease a PAPR/CM.

The present invention as set forth herein can be used for a UE using one or more SC-FDMA signals or clustered SC-FDMA. The present invention can be used when a plurality of SC-FDMA symbols are transmitted on independent channels configured on respective carriers in an uplink multi-carrier environment. In addition, the present invention can be used in case of clustered SC-FDMA where a plurality of subcarrier sets within a single carrier are DFT-spread and then mapped to distributed physical subcarriers.

In the embodiments of the present invention, a description has been mainly made of a data transmission and reception relationship between a BS and a UE. The BS refers to a terminal node of a network communicating directly with a UE. A specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an access point, etc. The term 'MS (mobile station)' may be replaced with a UE, a Subscriber Station (SS), a Mobile Subscriber Station (MSS), a terminal, etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Industrial Applicability

The present invention is applicable to a mobile communication terminal in a wireless mobile communication system.

The invention claimed is:

1. A method for transmitting an uplink signal at a User Equipment (UE) in an Long Term Evolution (LTE) wireless communication system, the method comprising:
    generating first uplink control information and second uplink control information;
    multiplexing the first uplink control information and the second uplink control information by using a modulation order corresponding to a length of a bit stream that is generated by sequentially arranging bits for the first uplink control information and bits for the second uplink control information; and
    simultaneously transmitting the multiplexed first uplink control information and second uplink control information in one or more uplink carriers via a predetermined uplink channel,
    wherein the first uplink control information is transmitted on a Physical Uplink Control CHannel (PUCCH) of a first uplink carrier among the one or more uplink carriers, and the second uplink control information is transmitted on a Physical Uplink Shared CHannel (PUSCH) of the first uplink carrier or a second uplink cartier among the one or more uplink carriers,
    wherein the first uplink control information is an ACKnowledgment (ACK)/Negative ACK (NACK), and the second uplink control information is periodic Channel Status Information (CSI),
    wherein the first uplink carrier is a primary carrier and different from the second uplink carrier;
    wherein when the first control information requires a lower propagation error rate than the second control information, a MSB (Most Significant Bit) of the bit stream is configured to map the first control information and a first subset of symbols of the predetermined uplink channel for the first control information is configured to have more pilot signal than a second subset of symbols of the predetermined uplink channel for the second control information, where each of the first and the second subsets of symbols includes one or more Single Carrier Frequency Division Multiple Access (SC-FDMA) symbols.

2. A method for transmitting an uplink signal at a User Equipment (UE) in an Long Term Evolution (LTE) wireless communication system, the method comprising:
    generating first uplink control information and second uplink control information;
    multiplexing the first uplink control information and the second uplink control information by using a modulation order corresponding to a length of a bit stream that is generated by sequentially arranging bits for the first uplink control information and bits for the second uplink control information; and
    simultaneously transmitting the multiplexed first uplink control information and second uplink control information in one or more uplink carriers via a predetermined uplink channel, wherein the first uplink control information is transmitted on a Physical Uplink Control CHannel (PUCCH) of a first uplink carrier among the one or more uplink carriers, and the second uplink control information is transmitted on a Physical Uplink Shared CHannel (PUSCH) of the first uplink carrier or a second uplink cartier among the one or more uplink carriers,
    wherein the first uplink control information is a Scheduling Request (SR), and the second uplink control information is periodic Channel Status Information (CSI),
    wherein the first uplink carrier is a primary carrier and different from the second uplink carrier,
    wherein when the first control information requires a lower propagation error rate than the second control information, a MSB (Most Significant Bit) of the bit stream is configured to map the first control information and a first subset of symbols of the predetermined uplink channel for the first control information is configured to have more pilot signal than a second subset of symbols of the predetermined uplink channel for the second control information, where each of the first and the second subsets of symbols includes one or more Single Carrier Frequency Division Multiple Access (SC-FDMA) symbols.

3. The method according to claim 1, wherein each of the first uplink control information and the second uplink control information corresponds to one or more downlink carriers.

4. The method according to claim 1, wherein the first uplink control information and the second uplink control information are about different cells.

5. The method according to claim 2, wherein each of the first uplink control information and the second uplink control information corresponds to one or more downlink carriers.

6. The method according to claim 2, wherein the first uplink control information and the second uplink control information are related to different cells.

7. A User Equipment (UE) configured to transmit an uplink signal in an Long Term Evolution (LTE) wireless communication system, the UE comprising:
- a transmitter; and
- a processor configured to:
- generate first uplink control information and second uplink control information; multiplex the first uplink control information and the second uplink control information by using a modulation order corresponding to a length of a bit stream that is generated by sequentially arranging bits for the first uplink control information and bits for the second uplink control information; and
- simultaneously transmit the multiplexed first uplink control information and second uplink control information in one or more uplink carriers via a predetermined uplink channel, wherein the first uplink control information is transmitted on a Physical Uplink Control CHannel (PUCCH) of a first uplink carrier among the one or more uplink carriers, and the second uplink control information is transmitted on a Physical Uplink Shared CHannel (PUSCH) of the first uplink carrier or a second uplink carrier among the one or more uplink carriers, wherein the first uplink control information is a Scheduling Request (SR) or an ACKnowledgment (ACK)/Negative ACK (NACK), and the second uplink control information is periodic Channel Status Information (CSI), wherein the first uplink carrier is a primary carrier and different from the second uplink carrier, wherein when the first control information requires a lower propagation error rate than the second control information, a MSB (Most Significant Bit) of the bit stream is configured to map the first control information and a first subset of symbols of the predetermined uplink channel for the first control information is configured to have more pilot signal than a second subset of symbols of the predetermined uplink channel for the second control information, where each of the first and the second subsets of symbols includes one or more Single Carrier Frequency Division Multiple Access (SC-FDMA) symbols.

* * * * *